UNITED STATES PATENT OFFICE.

AUGUST F. KRUEGER, OF KANKAKEE, ILLINOIS, ASSIGNOR TO E. L. SHEPARD, OF CLEVELAND, OHIO, AND WM. S. BATES, OF CHICAGO, ILLINOIS, TRUSTEES.

TANNING PROCESS.

SPECIFICATION forming part of Letters Patent No. 442,684, dated December 16, 1890.

Application filed May 12, 1890. Serial No. 351,521. (No specimens.)

*To all whom it may concern:*

Be it known that I, AUGUST F. KRUEGER, of Kankakee, Illinois, have invented certain new and useful Improvements in Processes for Tanning, of which the following is a specification.

In carrying my invention into effect I first flesh, unhair, and bate the hides by any suitable process, and then wash them. I then handle them two or three times a day for three or four days in a solution of alum, salt, and cutch. I have obtained good results by using three pounds of alum, one pound of salt, and a half-pound of cutch to a sixty-pound hide, and I prefer those proportions; but of course they may be varied. I have also obtained good results by substituting equivalents for some of said chemicals—as, for example, saltpeter for salt, and japonica for cutch—and I consider all such changes as within my invention. After treating the hides as above I hang them for two or three days in bark-liquor formed of tan-bark or bark-extract and water, after which I dry them, then dampen and stuff them one or more times, after which they may be treated by well-known methods, according to the purpose for which they are to be used. The best way to use the bark-liquor is to make it weak at first when the hides are placed in it—say 10° strong—and to gradually increase its strength to, say, about 30°.

I claim—

1. The herein-described process of tanning hides, consisting in subjecting them to the action of alum, salt, and cutch, and then to the action of bark-liquor, substantially as set forth.

2. The herein-described process of tanning hides, consisting in subjecting them to the action of alum, salt, and cutch, and then to the action of bark-liquor, and gradually increasing the strength of said bark-liquor during the time of its action, substantially as set forth.

3. The herein-described process of tanning hides, consisting in fleshing, unhairing, and bating them, then treating them with alum, salt, and cutch, then treating them with bark-liquor, and then stuffing them, substantially as set forth.

AUGUST F. KRUEGER.

Witnesses:
W. S. BATES,
C. R. CALKINS.